United States Patent [19]

Tanaka

[11] Patent Number: 4,670,826
[45] Date of Patent: Jun. 2, 1987

[54] CONTROL METHOD FOR CYCLOCONVERTER AND CONTROL APPARATUS THEREFOR

[75] Inventor: Shigeru Tanaka, Tama, Japan

[73] Assignee: Kabushiki Kaisha Toshiba, Kawasaki, Japan

[21] Appl. No.: 813,985

[22] Filed: Dec. 27, 1985

[30] Foreign Application Priority Data

Dec. 27, 1984 [JP] Japan ............................. 59-273678
Jun. 10, 1985 [JP] Japan ............................. 60-124281

[51] Int. Cl.⁴ ............................................. H02M 0/00
[52] U.S. Cl. ..................................... 363/10; 363/161; 323/207
[58] Field of Search ........................... 363/159–161, 363/10; 323/205, 207, 208

[56] References Cited

U.S. PATENT DOCUMENTS

| | | | |
|---|---|---|---|
| 3,609,509 | 9/1971 | Lafuze ............................. | 363/161 |
| 3,959,719 | 5/1976 | Espelage ......................... | 363/161 X |
| 3,959,720 | 5/1976 | Bose et al. ...................... | 363/161 X |
| 4,418,380 | 11/1983 | Tanaka et al. .................. | 363/161 X |
| 4,529,925 | 7/1985 | Tanaka et al. .................. | 363/161 X |
| 4,570,214 | 2/1986 | Tanaka ............................ | 363/160 |

FOREIGN PATENT DOCUMENTS 59-14988 4/1984 Japan.

Primary Examiner—Patrick R. Salce
Assistant Examiner—Marc S. Hoff
Attorney, Agent, or Firm—Schwartz, Jeffery, Schwaab, Mack, Blumenthal & Evans

[57] ABSTRACT

A control system for a cycloconverter of the circulating current type produces an ac current of a variable frequency. The cycloconverter is configured to connect a power factor compensating capacitor at its receiving-end, thus to control a lagging reactive power due to a circulating current flowing in the cycloconverter so as to cancel a leading reactive power due to the power factor compensating capacitor. Such a control is carried out under the condition of an operation below the rated load. In contrast, under the condition of an operation above the rated load, a control is effected so that the circulating current flowing in the cycloconverter is substantially kept constant.

2 Claims, 7 Drawing Figures

CONTROL METHOD FOR CYCLOCONVERTER AND CONTROL APPARATUS THEREFOR

BACKGROUND OF THE INVENTION

The present invention relates to a cycloconverter system of the circulating current type to deliver a variable frequency ac current to a single- or polyphase load.

A cycloconverter is an apparatus to directly convert an ac power having a constant frequency into an ac power having a different frequency. The drawback with the cycloconverter is that it is necessary to commutate thyristors serving as elements constituting the cycloconverter by a power supply voltage, with the result that a large reactive power is produced from a power source. Further, the reactive power always varies in synchronism with a frequency on the side of a load. As a result, this not only requires the capacitance of a power system equipment to be increased, but also gives various bad influences on electric equipment connected to the same system.

To overcome this, a measure has been taken to install a reactive power compensating device at a receiving-end of a cycloconverter. However, such a measure results in large equipment, an increased area therefor and a high cost.

In view of this, a reactive power compensative cycloconverter as disclosed in the Japanese Publication Tokkaisho No. 56-44382 etc. is proposed to solve the above-mentioned problem. Namely, a cycloconverter of the circulating current type is used to connect a power factor compensating capacitor at a receiving-end of the cycloconverter, thus to control a circulating current of the cycloconverter so that a leading reactive power by the power factor compensating capacitor and a lagging reactive power by the cycloconverter are cancelled with each other. The role of a reactive power compensating device which has been needed in the prior art is incorporated within the cycloconverter itself. As a result, the conventional reactive power compensating device is not needed. According to this, the cycloconverter can be of a small size and lightened, and its cost can be reduced.

In the above-mentioned reactive power compensative cycloconverter system, the capacitance of a power factor compensating capacitor at the receiving-end is determined as a standard when the cycloconverter effects a rated operation. When an overload operation is expected, it is necessary to provide in advance a power factor compensating capacitor having a capacitance to cope therewith.

In other words, if one attempts to affect a control such that an input power factor at a receiving-end is always maintained at 1, an output capacity of the cycloconverter is determined by the capacitance of the power factor compensating capacitor, with the result that an overload running which requires a capacity above the capacitance of the load capacitor is impossible.

Further, when a power factor compensating capacitor having an excessive capacitance is connected in advance in anticipation of a overload operation, a circulating current which is to flow in a cycloconverter at the time of a rated load or a light load is increased. As a result, this leads to an increase in capacity of a converter or a power transformer, or will result in a system having a power efficiency due to an increase in loss.

SUMMARY OF THE INVENTION

With the above in view, an object of the present invention is to provide a control method for a cycloconverter of the circulating current type and a control apparatus therefor which makes it possible to effect a stabilized overload operation without increasing the capacitance of a power factor compensating capacitor.

In accordance with the present invention, by making use of the advantage (high upper limit of an output frequency) of a cycloconverter of the circulating current type, an overload operation is carried out wherein a reactive power control is effected so that an input power factor is maintained at 1 until reaching a rated load. Accordingly, it is sufficient to provide for a power factor compensating capacitor having a capacitance enough to cancel a lagging reactive power given by the cycloconverter at the time of the rated operation.

At the time of an overload operation, the reactive power control at a receiving-end stop control such that a minimum circulating current continues to flow in the cycloconverter. Thus, there is no possibility that a break or interruption of a circulating current occurs, thus enabling a stabilized overload operation.

DETAILED DESCRIPTION OF THE PREFERRED EMBODIMENTS

The present invention will be described in detail in connection with preferred embodiments with reference to attached drawings.

Figure 1:
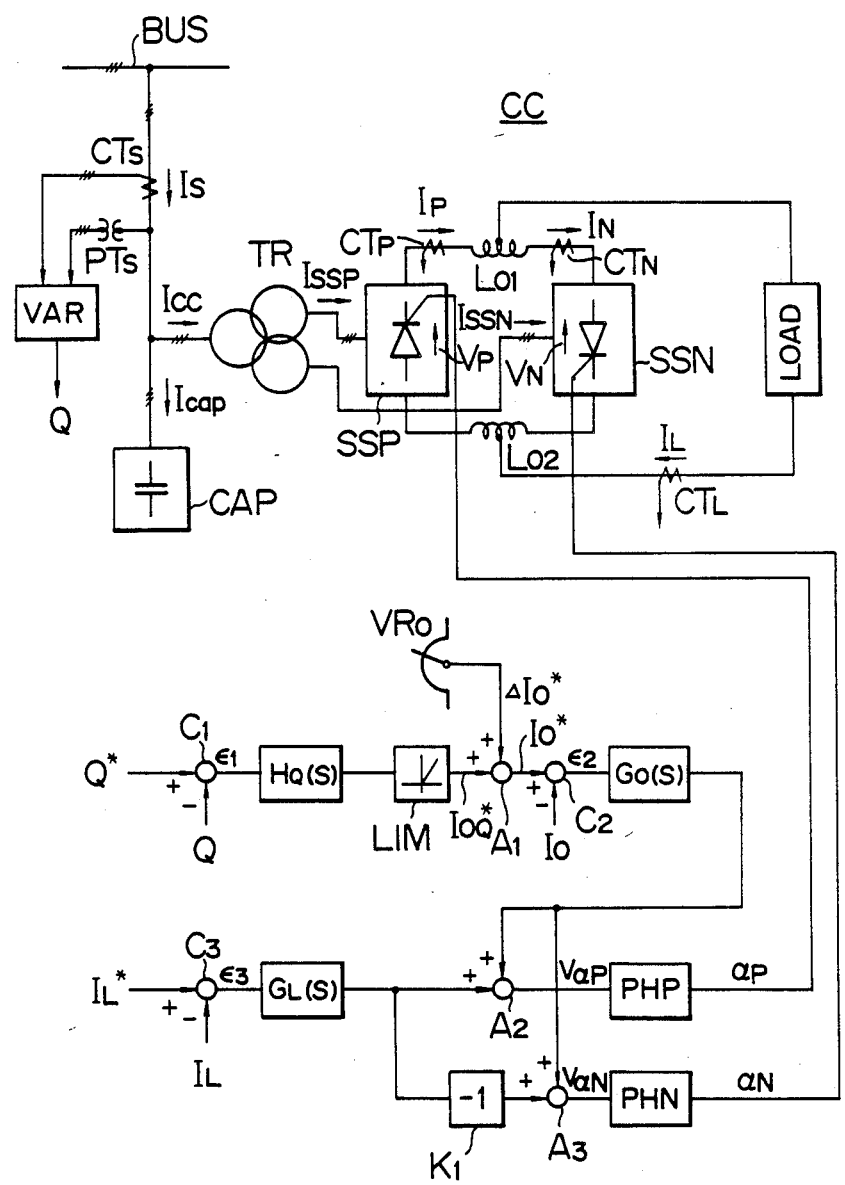
FIG. 1 is a block diagram illustrating an embodiment of a cycloconverter system according to the present invention.

Referring to FIG. 1, there is shown, in a block form, a first preferred embodiment of a cycloconverter system according to the present invention.

The cycloconverter system including a power supply line BUS of a three phase power supply, a power factor compensating capacitor assembly CAP comprising delta or star connected capacitors, a power transformer TR, a cycloconverter CC of the circulating current type, and a load LOAD.

The cycloconverter CC comprises a positive group converter SSP, a negative group converter SSN, and dc reactors $L_{01}$ and $L_{02}$ with intermediate taps.

A control circuit for the cycloconverter CC comprises a load current detector CTL, an output current detector $CT_P$ of the positive group converter, an output current detector $CT_N$ of the negative group converter, a transformer $PT_S$ for detecting a three phase ac voltage at a receiving-end, a current transformer $CT_S$ for detecting a three-phase ac current, a reactive power computing circuit VAR, comparators $C_1$, $C_2$ and $C_3$, adders $A_1$, $A_2$ and $A_3$, control compensating circuits $H_Q(S)$, $G_O(S)$ and $G_L(S)$, a limiter circuit LIM, a circulating current setter $VR_O$, an operational amplifier $K_1$ and phase control circuits PHP and PHN.

Initially, the operation of a load current control will be described.

A load current command $I_L^*$ and a value detected of a current $I_L$ flowing in the load are input to the comparator $C_3$ to obtain an error $\epsilon_3 = I_L^* - I_L$. The error $\epsilon_3$ is input to the load current control compensating circuit $G_L(S)$ to carry out proportional amplification or integral amplification. In this example, the load current control compensating circuit $G_L(S)$ includes only a proportional element (gain $K_L$) for brevity of explanation. It is now assumed that an output signal from the circulating current control circuit $G_O(S)$ is sufficiently small. When the output signal is negligible, an input signal of the phase control circuit PHP for the positive group converter SSP is expressed as $V_{\alpha P} = K_L \cdot \epsilon_3$ and its output voltage is expressed as follows:

$$V_P = K_V \cdot V_S \cdot \cos\alpha_P \propto V_{\alpha P}.$$

At this time, to the phase control circuit PHN for the negative group converter SSN, a signal $V_{\alpha N} = -K_L$ is obtained by passing an output signal $K_L \cdot \epsilon_3$ from the control compensating circuit $G_L(S)$ through the inverting operational amplifier $K_1$. Accordingly, an output voltage $V_N$ of the negative group converter SSN is expressed as $$V_N = -K_V \cdot V_S \cdot \cos\alpha_N \propto -V_{\alpha N} = V_P,$$

where $K_V$ denotes a conversion constant, $V_S$ a power supply voltage, and $\alpha_P$ and $\alpha_N$ firing phase angles.

Namely, an ordinary operation is carried out with the output voltage $V_P$ of the positive group converter SSP and the output voltage $V_N$ of the negative group converter SSN being balanced with each other at the load terminal. In this instance, the relationship of $\alpha_N = 180° - \alpha_P$ holds in connection with the firing phase angles of the two converters. To the load LOAD, $V_L = (V_P + V_N)/2$ which is an average value of output voltages of the two converters is applied.

When $I_L^* > I_L$, the error $\epsilon_3$ becomes a positive value to increase the output voltages $V_P$ and $V_N$ in a direction indicated by the arrow in the figure. Accordingly, the load terminal voltage $V_L$ is increased to increase the load current $I_L$. In contrast, when $I_L^* < I_L$, the error $\epsilon_3$ becomes a negative value to produce the output voltages $V_P$ and $V_N$ in a direction opposite to the arrow in the figure. As a result, the load terminal voltage $V_L$ becomes a negative value to decrease the load current $I_L$. For this reason, the relationship of $I_L^* \approx I_L$ will be eventually established, thus placing the control system in a balanced condition.

Further, when an operation is effected to sinusoidally change the current command $I_L^*$, the error $\epsilon_3$ varies according to this. Accordingly, the above-mentioned firing phase angles $\alpha_P$ and $\alpha_N$ are controlled in a manner that a sinewave current $I_L$ flows in the load. In such an ordinary operation, the voltages of the positive group converter SSP and the negative group converter $V_N$ are balanced with each other, with the result that little circulating current $I_O$ flows.

Subsequently, the control operation of the circulating current $I_O$ will be described.

The circulating current $I_O$ of the cycloconverter is detected as follows. The circulating current $I_O$ is determined by obtaining the sum of a value detected of the output current $I_P$ of the positive group converter SSP to a value detected of the output current $I_N$ of the negative converter SSN, subtracting an absolute value of a value detected of the load current $I_L$ from the sum, and multiplying it by one-half. The relationship is expressed as follows:

$$I_O = (I_P + I_N - |I_L|)/2$$

The circulating current $I_O$ thus obtained is compared with the command value $I_O^*$. An error $\epsilon_2 = I_O^* - I_O$ is input to the next stage of the circulating current control compensating circuit $G_O(S)$. The error $\epsilon_2$ undergoes proportional amplification or integral amplification. In this example, it is assumed for brevity of explanation that $G_O(S) = k_O$, i.e., the circulating current control compensating circuit $G_O(S)$ includes only a proportional element. Thus, an output signal of the circulating current control compensating circuit $G_O(S)$ is input to the adders $A_2$ and $A_3$.

Accordingly, input voltages $V_P$ and $V_N$ to the phase control circuits PHP and PHN are respectively expressed as follows:

$$V_P = K_L \cdot \epsilon_3 + K_O \cdot \epsilon_2, \text{ and}$$
$$V_N = -K_L \cdot \epsilon_3 + K_O \cdot \epsilon_2.$$

Accordingly, the relationship of $\alpha_N \approx 180° - \alpha_P$ cannot be maintained. The output voltage $V_P$ of the positive group converter SSP and the output voltage $V_N$ of the negative group converter SSN are unbalanced by a value proportional to $K_O \cdot \epsilon_2$. Its difference voltage $(V_P - V_N)$ is applied to the dc reactors $L_{01}$ and $L_{02}$, with the result that the circulating current $I_O$ flows.

When $I_O^* > I_O$, the error $\epsilon_2$ becomes a positive value. This increases the output voltage $V_P$ and decreases the output voltage $V_N$. Accordingly, the difference voltage $(V_P - V_N)$ becomes a positive value to increase the circulating current $I_O$. In contrast, when $I_O^* < I_O$, the error $\epsilon_2$ becomes a negative value. This decreases the output voltage $V_P$ and increases the output voltage $V_N$. Accordingly, the difference voltage $(V_P - V_N)$ becomes a negative value to decrease the circulating current $I_O$. The relationship of $I_O^* \approx I_O$ will be eventually established, thus placing the control system in a balanced condition.

In such a circulating current control, the output voltages $V_P$ and $V_N$ of the positive and negative group converters vary. However, since the load terminal voltage $V_L$ is obtained as an average value of the output voltages $V_P$ and $V_N$, such a change does not affect the load current control.

On the other hand, the reactive power control is carried out as follows.

At the receiving-end, the three phase current detector $CT_S$ and the three phase voltage detector $PT_S$ are provided. The reaction power Q is computed by the reactive power computation circuit VAR. The command value $Q^*$ for the reactive power control is ordinarily set at zero. The comparator C₁ produces an error $\epsilon_1 = Q^* - Q$. The reactive power control compensating circuit $H_Q(S)$ ordinarily employs integral element in order to allow the steady-state error $\epsilon_1$ to be zero. By passing an output from the control compensating circuit $H_Q(S)$ through the adder A₁, the above-mentioned circulating current command value $I_O^*$ is obtained.

Figure 2:
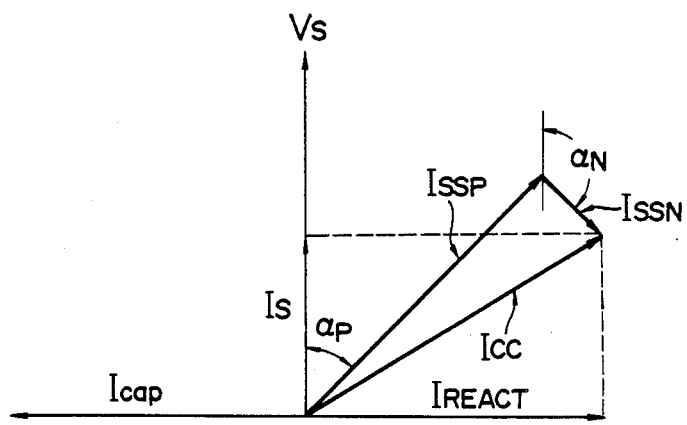
FIG. 2 is a view showing the relationship between voltage and current vectors for explaining the operation of the system shown in FIG. 1.

FIG. 2 is a view showing the relationship between voltage and current vectors at the receiving-end wherein the vector relationship represents a single-phase of the three phase power supply. In this figure, $V_S$ represents a power supply voltage, $I_{cap}$ a leading current flowing in the power factor compensating capacitor, $I_{CC}$ an input current of the cycloconverter, $I_S$ an effective value of the input current, and $I_{REACT}$ a reactive value of the $I_S$. Further, $I_{SSP}$ and $I_{SSN}$ represent input currents of the positive and negative group converters, respectively. Where a current conversion factor of the converter is denoted by $K_1$, the above-mentioned input currents $I_{SSP}$ and $I_{SSN}$ are expressed as follows:

$$I_{SSP} = K_1 \cdot I_P, \text{ and}$$
$$I_{SSN} = K_1 \cdot I_N.$$

This vector view indicates the condition where the load current $I_L$ is delivered from the positive group converter SSP. The output current $I_P$ of the positive group converter is expressed as $I_P = I_L + I_O$ and the output current $I_N$ of the negative group converter is expressed as $I_N = I_O$.

The input current $I_{CC}$ of the cycloconverter is obtained as the vector sum of the input currents $I_{CC}$ and $I_{SSP}$. The effective value $I_S$ and the reactive value $I_{REACT}$ of the input current $I_{CC}$ can be expressed as follows:

$$I_S = I_{SSP} \cdot \cos\alpha_P + K_1 I_O \cos\alpha_N$$
$$= K_1(I_L + I_O) \cdot \cos\alpha_P + K_1 I_O \cos\alpha_N$$
$$\approx K_1 I_L \cdot \cos\alpha_P$$

$$I_{REACT} = I_{SSP} \cdot \sin\alpha_P + I_{SSN} \cdot \sin\alpha_N$$
$$= K_1(I_L + I_O)\sin\alpha_P + K_1 I_O \sin\alpha_N$$
$$\approx K_1(I_L + 2I_O)\sin\alpha_P$$

where the relationship of $\alpha_N \approx 180 - \alpha_P$ is introduced in the above deviation. Namely, the circulating current $I_O$ flowing in the cycloconverter does not affect the effective value $I_S$ on the input side, but affects the reactive value $I_{REACT}$. By effecting a control of the circulating current $I_O$ so that the concerned reactive current $I_{REACT}$ is always equal to the leading current $I_{CAP}$ of the power factor compensating capacitor, the current $I_S$ delivered from the power supply always becomes effective component, thus maintaining the fundamental wave power factor at 1.

Turning to FIG. 1, when $Q^* > Q$ (the lag becomes positive), the error $\epsilon_1 Q^* - Q$ becomes positive to increase the circulating current command value $I_O^*$ through the control compensating circuit $H_Q(S)$. Accordingly, the actual value $I_O \approx I_O$ of the circulating current is increased, thus to increase the lagging reactive current value $I_{REACT}$ of the input current $I_{CC}$ flowing in the cycloconverter. As a result, the lagging reactive power Q at the power receiving-end is increased, effecting a control so that $Q \approx Q^*$ is attained. In contrast, when $Q^* < Q$, the circulating current $I_O$ is decreased, with the result that the delayed reactive power Q is also decreased. Thus, the cycloconverter is placed in a balanced condition where $Q \approx Q^*$.

Figure 3:
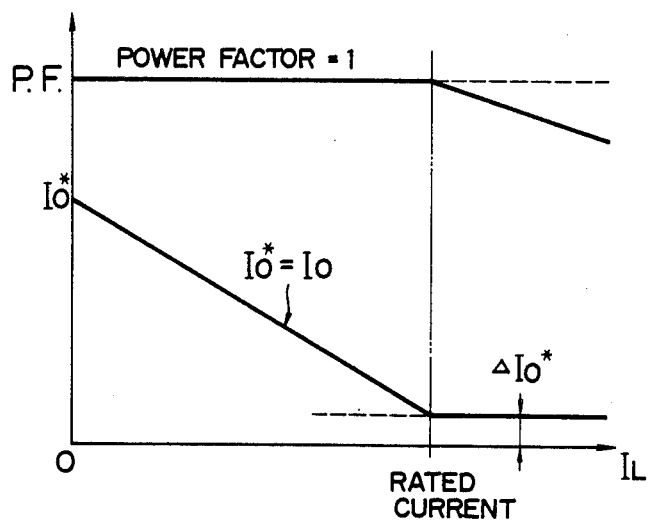
FIG. 3 is a view showing the relationship of a load current $I_L$ versus a circulating current $I_o$ and a power factor at a receiving-end for explaining the operation of the system shown in FIG. 1.

FIG. 3 represents the relationship of the load current $I_O$ versus the circulating current $I_O$ and the power factor P.F.

When the load current $I_L$ is zero, only the circulating current $I_O$ flows in the cycloconverter CC to maintain the relationship $I_{cap} = I_{REACT}$. Accordingly, the value of circulating current becomes large. As the value of the load current $I_L$ increases, the value of the circulating current $I_O$ is decreased, thus maintaining the input power factor at 1. When the load current exceed a rated current by further increasing the load current $I_L$, the leading reactive power given by the power factor compensating capacitor CAP lacks with respect to the lagging reactive power given by the cycloconverter, resulting in the lagging power factor at the receiving-end. Accordingly, the value of the error $\epsilon_1 = Q^* - Q$ in the reactive power control becomes negative and the output of the control compensating circuit $H_Q(S)$ also becomes negative. However, when the output of $H_Q(S)$ represents a negative value by the limiter circuit LIM, the output $I^*_{QQ}$ of the limiter circuit LIM becomes zero.

On the other hand, another circulating command value $\Delta I_O^*$ is given by a circulating current setter $VR_O$. The current command value $\Delta I_O^*$ is set at a value such that circulating current of the cycloconverter CC is not interrupted.

Accordingly, the output $I_O^* = I^*_{QQ} + \Delta I_O^*$ of the adder is actually given as the circulating current command value. An actual circulating current $I_O$ is controlled in accordance with the output of the adder.

Accordingly, even when the load current $I_L$ increases to exceed a rating value, a control is effected so that the circulating current $I_O$ of the cycloconverter CC is not interrupted.

In such a case, the power factor at the receiving-end is not equal to 1. Accordingly, according as the load current $I_L$ increases, there occurs a condition where the power factor lags. This is no problem in the system where the overload running is seldom carried out.

Figure 4:
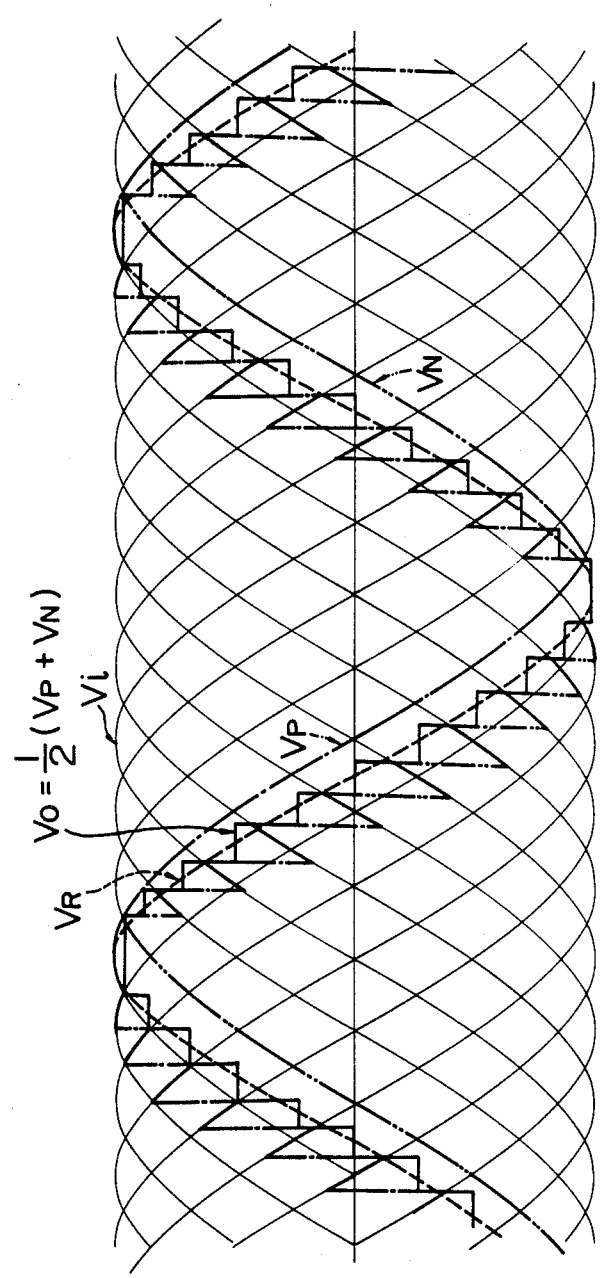
FIG. 4 is a view showing an output voltage waveform of a cycloconverter of the circulating current type.

FIG. 4 shows an output voltage waveform of a cycloconverter of the circulating current type having twelve control phases when the setting is made such that an output frecuency $f_0$ is 1.2 times larger than an input frequency $f_1$. In this figure, $V_1$ (this solid line) represents an input voltage, $V_P$ (thick single dotted lines) an output voltage of the positive group converter, $V_N$ (thick double dotted lines) an output voltage of the negative group converter, $V_R$ (thick dotted lines) an output voltage required, and $V_O$ (thick solid line) an output voltage (which is applied to the load) actually produced by the cycloconverter.

The output voltage $V_O$ is obtained as an average of the output voltages $V_P$ and $V_N$ and represents a stair-stepped waveform. The output voltages $V_P$ and $V_N$ are created by connecting portions (segments) of the input voltage Vi to each other, respectively. When attention is drawn to only each voltage, an uncontrollable period occurs in the same manner as the cycloconverter of a non-circulating current type does. However, when the output voltage $V_P$ is in an uncontrollable condition, the output voltage $V_N$ functions so as to compensate for the lack of the ability of the former. On the other hand, in the range where the output voltage $V_N$ is in an uncontrollable condition, the output voltage $V_P$ functions so as to compensate for the lack of the ability of the former. As a result, the output voltage $V_O$ can be controlled so that it follows the command value $V_R$.

Namely, the normal operating mode of the cycloconverter of the circulating current type is to operate both the positive group converter SSP and the negative converter SSN at the same time. Accordingly, if an operating mode is employed to activate only one of them, viz., to allow the circulating current to be zero, the cycloconverter has a sawtooth output waveform due to the operation of either one of the positive and negative group converters, with the result that many hormonics are included.

Accordingly, the cycloconverter of the circulating current type has employs an operating mode such that the circulating current simply flows therein.

Figure 5:
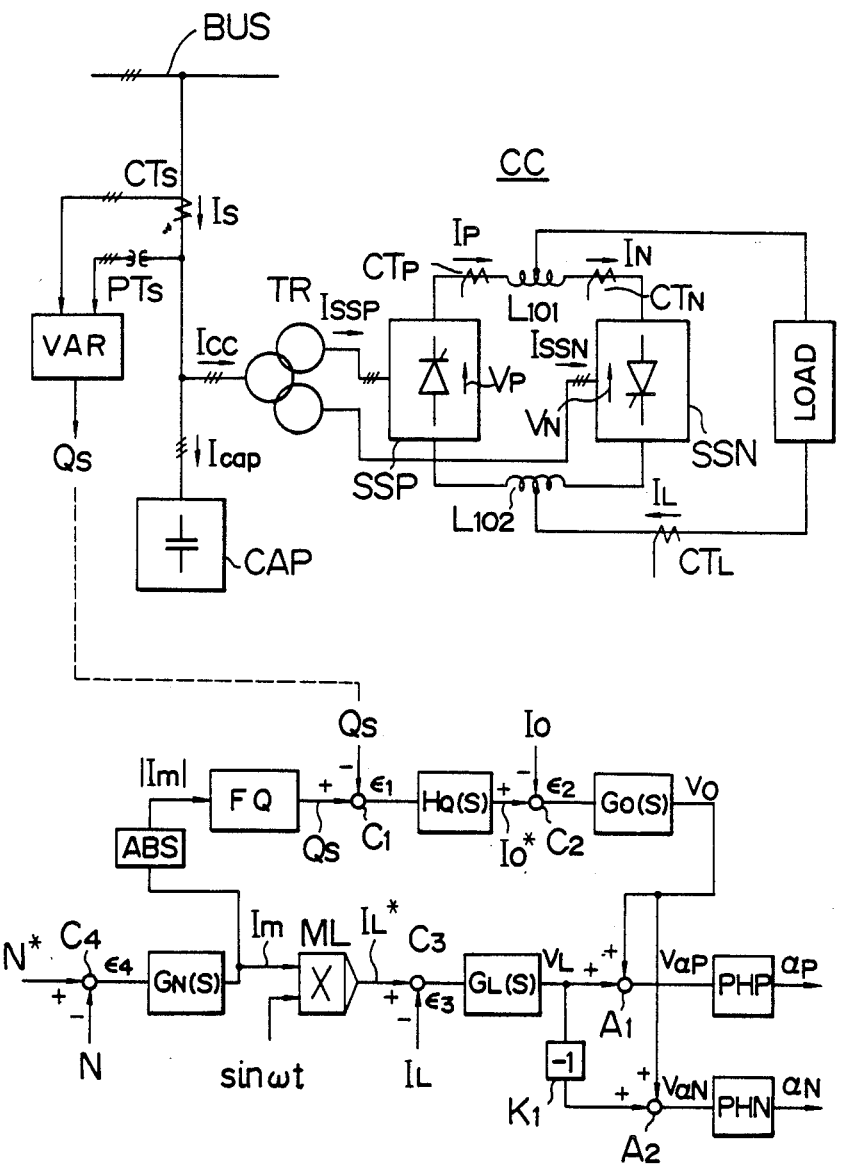
FIG. 5 is a block diagram illustrating another embodiment of a cycloconverter system according to the present invention.

FIG. 5 is a block diagram illustrating another embodiment of a cycloconverter system according to the present invention.

The cycloconverter system in this embodiment includes a power supply line BUS of a three phase power supply, a power factor compensating capacitor assembly CAP comprising delta or star connected capacitors, a power transformer TR, a cycloconverter CC of the circulating current type, and a load LOAD.

The cycloconverter CC comprises a positive group converter SSP, a negative group converter SSN, and dc reactors $L_{01}$ and $L_{02}$ with intermediate taps.

A control circuit for the cycloconverter CC comprises a load current detector $CT_L$, an output current detector $CT_P$ of the positive group converter, an output current detector $CT_N$ of the negative group converter, a transformer $PT_S$ for detecting a three phase ac voltage at a receiving-end, a current transformer $CT_S$ for detecting a three phase ac current, a reactive power computation circuit VAR, comparators $C_1$, $C_2$, $C_3$ and $C_4$, adders $A_1$ and $A_2$, a multiplier ML, control compensating circuits $G_N(S)$, $H_Q(S)$, $G_Q(S)$ and $G_L(S)$, an absolute value circuit ABS, a reactive power command value circuit FQ, an operational amplifier $K_1$, and phase control circuits PHP and PHN.

Here, reference is made to the case where a cycloconverter is applied to a speed control system for an electric motor. The output $I_m$ of the control compensating circuit $G_N(S)$ produced when a difference $\epsilon_4$ between the speed reference $N^*$ and the actual rotational speed $N$ is input to the control compensating circuit $G_N(S)$ corresponds to an amplitude of the motor current. The output $I_m$ fed to the amplifier ML and is then multiplied by a sinewave signal $\sin \omega t$ synchronous with a speed electromotive force of the motor thereat. Thus, the load current command $I_L^*$ is created as an output of the multiplier ML.

Initially, the operation of a load current control will be described.

A load current command $I_L^*$ and a value detected of a current $I_L$ flowing in the load are input to the comparator $C_3$ to obtain an error $\epsilon_3 = I_L^* - I_L$. The error $\epsilon_3$ is input to the load current control compensating circuit $G_L(S)$ to carry out proportional amplification or integral amplification. In this example, the load current control compensating circuit $G_L(S)$ includes only a proportional element (gain $K_L$) for brevity of explanation. It is now assumed that an output signal from the circulating current control circuit $G_L(S)$ is sufficiently small. When the output signal is negligible, an input signal of the phase control circuit PHP for the positive group converter SSP is expressed as $V_{\alpha P} K_L \cdot \epsilon_3$ and its output voltage is expressed as follows:

$$V_P = K_V \cdot V_S \cdot \cos \alpha_P \propto V_{\alpha P}.$$

At this time, to the phase control circuit PHN for the negative group converter SSN, a signal $V_{\alpha N} = -K_L \cdot \epsilon_3$ obtained by passing an output signal $K_L \cdot \epsilon_3$ from the control compensating circuit $G_L(S)$ through the inverting operational amplifier $K_1$ is input. Accordingly, an output voltage of the negative group converter SSN is expressed as $$V_N = -K_V \cdot V_S \cdot \cos \alpha_N \propto -V_{\alpha N} = V_P,$$

where $K_V$ denotes a conversion constant, $V_S$ a power supply voltage, and $\alpha_P$ and $\alpha_N$ firing phase angles.

Namely, an ordinary running is carried out with the output voltage $V_P$ of the positive group converter SSP and the output voltage $V_N$ of the negative group converter SSN being balanced with each other at the load terminal. In this instance, the relationship of $\alpha_N = 180° - \alpha_P$ holds in connection with the firing phase angles of the two converters. To the load LOAD, $V_L = (V_P + V_N)/2$ which is an average value of output voltages of the two converters is applied.

When $I_L^* > I_L$, the error $\epsilon_3$ becomes a positive value to increase the output voltages $V_P$ and $V_N$ in a direction indicated by the arrow in the figure. Accordingly, the load terminal voltage $V_L$ is increased to increase the load current $I_L$. In contrast, when $I_L^* < I_L$, the error $\epsilon_3$ becomes a negative value to produce the output voltages $V_P$ and $V_N$ in a direction opposite to the arrow in the figure. As a result, the load terminal voltage $V_L$ becomes a negative value to decrease the load current $I_L$. For this reason, the relationship of $I_L^* \approx I_L$ will be eventually established, thus placing the control system in a balanced condition.

Further, when an operation is effected to sinusoidally change the current command $I_L^*$, the error $\epsilon_3$ varies according to this. Accordingly, the above-mentioned firing phase angles $\alpha_P$ and $\alpha_N$ are controlled in a manner that a sinewave current $I_L$ flows in the load. In such an ordinary operation, the voltages of the positive group converter SSP and the negative group converter $V_N$ are balanced with each other, with the result that little circulating current $I_O$ flows.

Subsequently, the control operation of the circulating current $I_O$ will be described.

The circulating current $I_O$ of the cycloconverter is detected as follows. The circulating current $I_O$ is determined by obtaining the sum of a value detected of the output current $I_P$ of the positive group converter SSP to a value detected of the output current $I_L$ of the negative converter SSN, subtracting an absolute value of a value detected of the load current $I_L$ from the sum, and multiplying it by one-half. The relationship is expressed as follows:

$$I_O = (I_P + I_N - |I_L|)/2$$

The circulating current $I_O$ thus obtained is compared with the command value $I_O^*$. An error $\epsilon_2 = I_O^* - I_O$ is input to the next stage of the circulating current control compensating circuit $G_Q(S)$. The error $\epsilon_2$ undergoes proportional amplification or integral amplification. In this example, it is assumed for brevity of explanation that $G_Q(S) = K$, i.e., the circulating current control compensating circuit $G_O(S)$ includes only a proportional element. Thus, an output signal of the circulating current control compensating circuit $G_O(S) = K_O$ is input to the adders $A_1$ and $A_2$.

Accordingly, input voltages $V_P$ and $V_N$ to the phase control circuits PHP and PHN are respectively expressed as follows:

$$V_P = K_L \cdot \epsilon_3 + K_O \cdot \epsilon_2, \text{ and } V_N = -K_L \cdot \epsilon_3 + K_O \cdot \epsilon_2.$$

Accordingly, the relationship of $\alpha_N \approx 180° - \alpha_P$ can not be maintained. The output voltage $V_P$ of the positive group converter SSP and the output voltage $V_N$ of the negative group converter SSN are unbalanced by a value proportional to $K_O \cdot \epsilon_2$. Its difference voltage $(V_P - V_N)$ is applied to the dc reactors $I_{01}$ and $I_{02}$, with the result that the circulating current $I_O$ flows.

When $I_O^* > I_O$, the error $\epsilon_2$ becomes a positive value. This increases the output voltage $V_P$ and decreases the output voltage $V_N$. Accordingly, the difference voltage $(V_P - V_N)$ becomes a positive value to increase the circulating current $I_O$. In contrast, when $I_O^* < I_O$, the error $\epsilon_2$ becomes a negative value. This decreases the output voltage $V_P$ and increases the output voltage $V_N$. Accordingly, the difference voltage $(V_P - V_N)$ becomes a negative value to decrease the circulating current $I_O$. The relationship of $I_O^* \approx I_O$ will be eventually established, thus placing the control system in a balanced condition.

In such a circulating current control, the output voltages $V_P$ and $V_N$ of the positive and negative group converters vary. However, since the load terminal voltage $V_L$ is obtained as an average value of the out-put voltages $V_P$ and $V_N$, such a change does not affect the load current control.

On the other hand, the reactive power control is carried out as follows.

At the receiving-end, the three phase current detector $CT_S$ and the three phase voltage detector $PT_S$ are provided. The reactive power $Q_S$ is computed by the reactive power computation circuit VAR. The command value $Q^*$ of the reactive power is ordinarily set at zero. The comparator $C_1$ produces an error $\epsilon_1 = Q_S^* - Q_S$. The reactive power control compensating circuit $H_Q(S)$ ordinarily employs integral element in order to allow the steady-state error $\epsilon_1$ to be zero. The output of the reactive power compensating control circuit $H_Q(S)$ is the above-mentioned circulating current command value $I_O^*$.

FIG. 2 is a view showing the relationship between voltage and current vectors at the receiving-end wherein the vector relationship represents a single phase of the three phase power supply. In this figure, Icap represents a leading current flowing in the power factor compensating capacitor, $I_{CC}$ an input current of the cycloconverter, $I_s$ an effective component of the input component, and $I_{REACT}$ a reactive value of the $I_{REACT}$. Further, $I_{SSP}$ and $I_{SSN}$ represent input currents of the positive and negatige group converters, respectively. Where a current conversion factor of the converter is denoted by $K_1$, the above-mentioned input currents $I_{SSP}$ and $I_{SSN}$ are expressed as follows:

$$I_{SSP} = K_1 \cdot I_P, \text{ and}$$
$$I_{SSN} = K_1 \cdot I_N.$$

This vector view indicates the condition where the load current $I_L$ is delivered from the positive group converter SSP. The output current $I_P$ of the positive group converter is expressed as $I_P = I_L + I_O$ and the output current $I_N$ of the negative group converter is expressed as $I_N = I_O$.

The input current $I_{CC}$ of the cycloconverter is obtained as the vector sum of the input currents $I_{CC}$ and $I_{SSP}$. The effective component $I_S$ and the reactive component $I_{REACT}$ of the input current $I_{CC}$ can be expressed as follows:

$$I_S = I_{SSP} \cdot \cos\alpha_P + I_{SSN} \cdot \cos\alpha_N$$
$$= K_1(I_L + I_O) \cdot \cos\alpha_P + K_1 I_O \cos\alpha_N$$
$$= K_1 I_L \cdot \cos\alpha_P$$

$$I_{REACT} = I_{SSP} \cdot \sin\alpha_P + I_{SSN} \cdot \sin\alpha_N$$
$$= K_1(I_L + I_O)\sin\alpha_P + K_1 I_O \sin\alpha_N$$
$$\approx K_1(I_L + 2I_O)\sin\alpha_P$$

where the relationship of $\alpha_N \approx 180 - \alpha_P$ is introduced in the above derivation. Namely, the circulating current $I_O$ flowing in the cycloconverter does not affect the effective component $I_L$ on the input side, but affects the reactive component $I_{REACT}$. By effecting a control of the circulating current $I_O$ so that the concerned reactive current $I_{REACT}$ is always equal to the leading current $I_{CAP}$ of the phase advance capacitor, and the current $I_S$ delivered from the power supply always becomes effective component, thus maintaining the fundamental wave power factor at 1.

Turning to FIG. 5, when $Q_S^* > Q_S$ (the lag is a positive value), the error $\epsilon_1 Q_S^* - Q_S$ becomes positive to increase the circulating current command value $I_O^*$ through the control compensating circuit $H_Q(S)$. Accordingly, the actual value $I_O \approx I_O^*$ of the circulating current is increased, thus to increase the delay reactive current component $I_{REACT}$ of the input current $I_{CC}$ flowing in the cycloconverter. As a result, the delay reactive power Q at the power receiving-end is increased, effecting a control so that $Q \approx Q^*$ is attained. In contrast; when $Q^* < Q$, the circulating current $I_O$ is decreased, with the result that the delayed reactive power Q is also decreased. Thus, the cycloconverter is placed in a balanced condition where $Q_S \approx Q_S^*$ is attained.

Then, assuming that an electric motor is employed as the load, the operation of the rotational speed control for the motor will be described.

Where a dc motor is employed as the load, it can be said that the load LOAD in FIG. 1 corresponds to an armature winding of the dc motor. Further, where an ac motor is employed as the load, it can be said that the load LOAD in FIG. 1 corresponds to one phase of an armature winding of the ac motor. In this example, an explanation will be made in connection with the ac motor (synchronous motor).

A rotational speed N of the motor is detected by a tachogenerator or a rotatable pulse generator etc. An error $\epsilon_4 = N^* - N$ is obtained by comparing the speed command value $N^*$ with a speed value detected N in the comparator $C_4$. The error $\epsilon_4$ is input to the speed control compensating circuit $G_N(S)$ to carry out proportional amplification or integral amplification. Thus, the amplitude command value $I_m$ of the load current $I_L$ to be supplied to the motor winding is determined.

The multiplier ML is operative to multiply the amplitude command value $I_m$ by a unit sinewave (one phase)

sinωt synchronous with a rotational position of the motor. The output $I_L^* = I_m \cdot \sin\omega t$ serves as a current command value which will be supplied to the armature winding (one phase) of the motor.

Where a three-phase motor is employed as a load, current command values for respective phases are expressed as follows:

$$I^*_{LU} = I_m \cdot \sin\omega t$$
$$I^*_{LV} = I_m \cdot \sin(\omega t - \pi/3)$$
$$I^*_{LW} = I_m \cdot \sin(\omega t - 2\pi/3).$$

where ω represents a rotational angle frequency of the motor.

When $N^* > N$, the error $\epsilon_4$ becomes a positive value, the amplitude command value $I_m$ is increased to increase a load current (armature current), thus allowing a torque produced to be increased. Accordingly, the motor is accelerated, with the result that the relationship $N^* = N$ is eventually established, thus placing the system in a balanced condition.

In contrast, when $N^* < N$, the error $\epsilon_4$ becomes a negative value to allow the amplitude command value $I_m$ to be decreased or to be negative, thus decreasing a torque produced or by applying a regenerative braking to the motor. As a result, the motor is decelerated with the result the relationship $N^* = N$ is also eventually established, thus placing the system in a balanced condition.

Where the cycloconverter according to the present invention operates under condition of a load current below the rated value, it effects a control such that the reactive power at the receiving end becomes zero. However, where the cycloconverter operates under an overload condition, it effects a control such that the command value $Q_3^*$ for the reactive power control at the receiving-end is changed depending upon the magnitude (amplitude $I_m$) of the load current.

Namely, in FIG. 5, the current amplitude command value $I_m$ is input to the reactive power command value circuit FQ through the absolute value circuit ABS, thus obtaining the reactive power command value $Q_S^*$ at the receiving-end.

Figure 6:
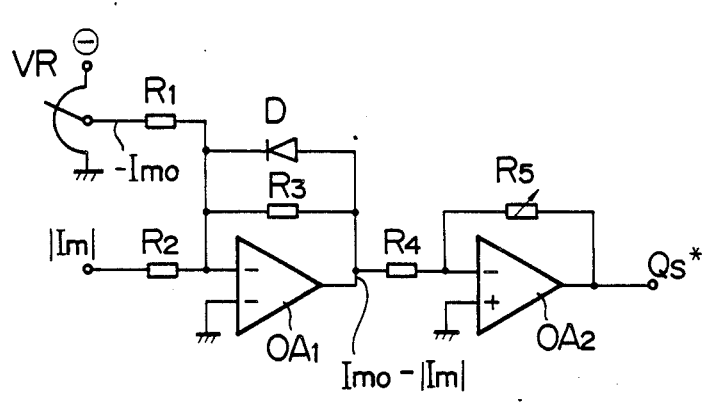
FIG. 6 is a circuit diagram illustrating an example of a reactive power command value circuit provided in the system shown in FIG. 5.

FIG. 6 is circuit diagram illustrating an example of the reactive power command value circuit FQ wherein OA$_1$ and OA$_2$ represent inverting operational amplifiers, R$_1$ to R$_5$ resistors, D a diode, and VR a level setter.

By using the level setter VR, an rated value $I_{mo}$ of the load current is set. Assuming that the resistance values of the resistors R$_1$ to R$_3$ provided in the inverting operational amplifier OA$_1$ are equal to each other, $(I_{mo} - |I_m|)$ can be determined as its output. When $I_{mo} - I_m$, i.e., a load current is less than the rated value, the value of $(I_{mo} - |I_m|)$ becomes positive. However, the output of the inverting operational amplifier OA$_1$ is forcedly suppressed to be zero by the action of the diode. In contrast, the value of $(I_{mo} - |I_m|)$ is output from the inverting operational amplifier OA$_1$.

On the other hand, the inverting operational amplifier OA$_2$ has an amplification factor $K_Q = (R_5/R_4)$. Accordingly, when $|I_m| \leq I_{mo}$, the reactive power command value $Q_3^*$ becomes equal to zero. In contrast, when $|I_m| - I_{mo}$, the reactive power command value $Q_S^*$ is expressed as $Q_S^* = K_Q(|I_m| - I_{mo})$.

Figure 7:
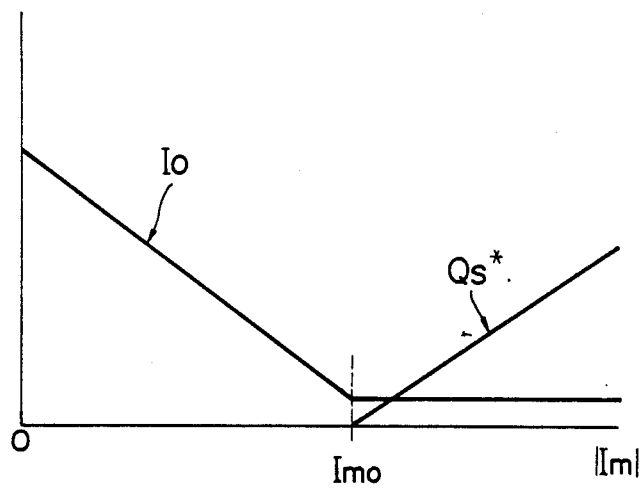
FIG. 7 is a view showing the relationship of a load current amplitude $I_m$ versus a reactive power command value $Q_s^*$ and a circulating current $I_o$ for explaining the operation of the system shown in FIG. 5.

FIG. 7 shows the above-mentioned relationship between $I_O$ and $Q_S$ wherein the load current amplitude $|I_m|$ of the reactive power command value $Q_S^*$ is always set at zero until reaching the rated value $I_{mo}$, and increases in proportion to the amplitude $|I_m|$ under an overload operation where a load current is above the rated value $I_{mo}$. In this instance, a proportional constant $K_Q$ is determined as a substantially constant such that the circulating current $I_O$ of the cycloconverter is not interrupted.

Accordingly, the circulating current $I_O$ of the cycloconverter decreases in inverse proportion to the absolute value $I_m$ of the amplitude of the load current $I_L$ so that the reactive power $Q_S$ becomes zero until the absolute value $I_m$ becomes equal to the rated value. In contrast, when the cycloconverter is operated under condition the absolute value $I_m$ exceeds the rated value, the reactive power $Q_S$ at the receiving-end does not become zero, thus shifting to a control such that the circulating current $I_O$ is not interrupted in accordance with the lagging reactive power.

It is to be noted that a control is not carried out such that the circulating current $I_O$ under the overload operation is completely kept constant, but a control is effected so that the reactive power at the receiving-end becomes equal to its command value $Q_S^*$. Accordingly, from a microscopic point of view, the circulating current changes every moment, thus maintaining the reactive power $Q_S$ at a constant.

Such a control provides an good effect with respect to harmonics of an input current of the cycloconverter. Namely, where an ac load is employed, there appear harmonics relevant to a frequency on the side of the load in the input current of the cycloconverter. It is considered that occurrence of such harmonics is due to changes in an effective power at the receiving-end of the cycloconverter and changes a reactive power at the receiving-end of the cycloconverter. In the case of a three-phase balanced load, the effective power becomes constant, with the result that harmonics of an input current caused thereby do not occur. However, the reactive power at the receiving-end of the cycloconverter changes every moment according to a phase control. Accordingly, even in the three-phase balanced load, there is a possibility that harmonics occur in a current on the input side.

By maintaining the reactive power at the receiving-end of the cycloconverter at a constant, it is possible to decrease harmonics (particularly, sideband waves coupled to a fundamental wave) on the input side.

The cycloconverter system according to the present invention effects a control such that the reactive power is kept constant, i.e., $Q_S = 0$ until the output reaches the rated load, thus making it possible to reduce harmonics on the input side for the reason stated above. Further, the cycloconverter according to the present invention effects a control such that the reactive power is kept constant, i.e., $Q_S = Q_S^*$ from a microscopic point of view under an operation above the rated load, thus making it possible to reduce harmonics in a current on the input side.

In the above-mentioned embodiments, it has been described that the single-phase load is employed. However, the present invention can be practiced in connection with a two-phase load or a polyphase load in the same manner as stated above.

Further, the present invention is also applicable to a cycloconverter delta-connected. Furthermore, when a polyphase output cycloconverter is employed, distribution of circulating currents in respective phases is possible. In addition, it is needless to say that various applications can be possible within a range where the gist of the present invention is not changed.

As stated above, the present invention can maintain the advantageous features of a cycloconverter of the circulating current type (small distortion in an output current, and high upper limit of an output frequency) even in an overload operation, thus ensuring a stabilized operation. Further, the present invention makes it possible to always maintain a power factor at the receiving-end at 1 until the output reaches the rated load operation and to have no necessity of remarkably increasing the capacitance of a power factor compensating capacitor connected at the receiving-end of the cycloconverter. Accordingly, an increase in the capacity of a power transformer or a converter required for an overload operation is relatively small, thus an overload operation is relatively small, thus enabling an operation with a high efficiency.

In addition, even in an overload operation, only the reactive power command value $Q_S^*$ at the receiving-end changes and the reactive power control is still continued. Namely, from a microscopic point of view, a control is maintained such that the reactive power is constant. Accordingly, this makes it possible to reduce harmonics (particularly, sideband waves coupled to a fundamental wave) on the input side which would occur due to changes in the reactive power.

What is claimed is:

1. A control method for a cycloconverter of the circulating current type comprising the steps of:

connecting a power factor compensating capacitor to a receiving end of said cycloconverter;

controlling a circulating current flowing in said cycloconverter so that a lagging reactive power of said cycloconverter and a leading reactive power of said power factor compensating capacitor are cancelled with each other until an output current of said cycloconverter reaches a rated load value; and controlling the circulating current flowing in said cycloconverter so that said circulating current is substantially maintained constant regardless of a power factor at said receiving-end after the output current of said cycloconverter exceeds said rated load value.

2. A cycloconverter apparatus comprising:

(a) an AC power supply;

(b) a cycloconverter of the circulating current type adapted to receive a power fed from said AC power supply;

(c) a single-phase or polyphase load adapted to receive a power fed from said cycloconverter;

(d) a power factor compensating capacitor connected at a receiving-end of said cycloconverter;

(e) controlling means to control an output current supplied to said load of said cycloconverter;

(f) outputting means to output a command value to said controlling means, said controlling means operative in response to said command value for controlling a reactive power at said receiving-end of said cycloconverter; and (g) means for changing said command value to said controlling means depending upon the value of said output current of said cycloconverter;

wherein said changing means is operative to output the command value of zero when said output current is less than a rated current value, and operative to increase the command value in proportion to the magnitude of the output current when the output current is above said rated current value.

* * * * *